(No Model.) 2 Sheets—Sheet 1.
J. L. JÖNSSON.
DRIVING MECHANISM FOR CENTRIFUGAL SEPARATORS.
No. 512,033. Patented Jan. 2, 1894.
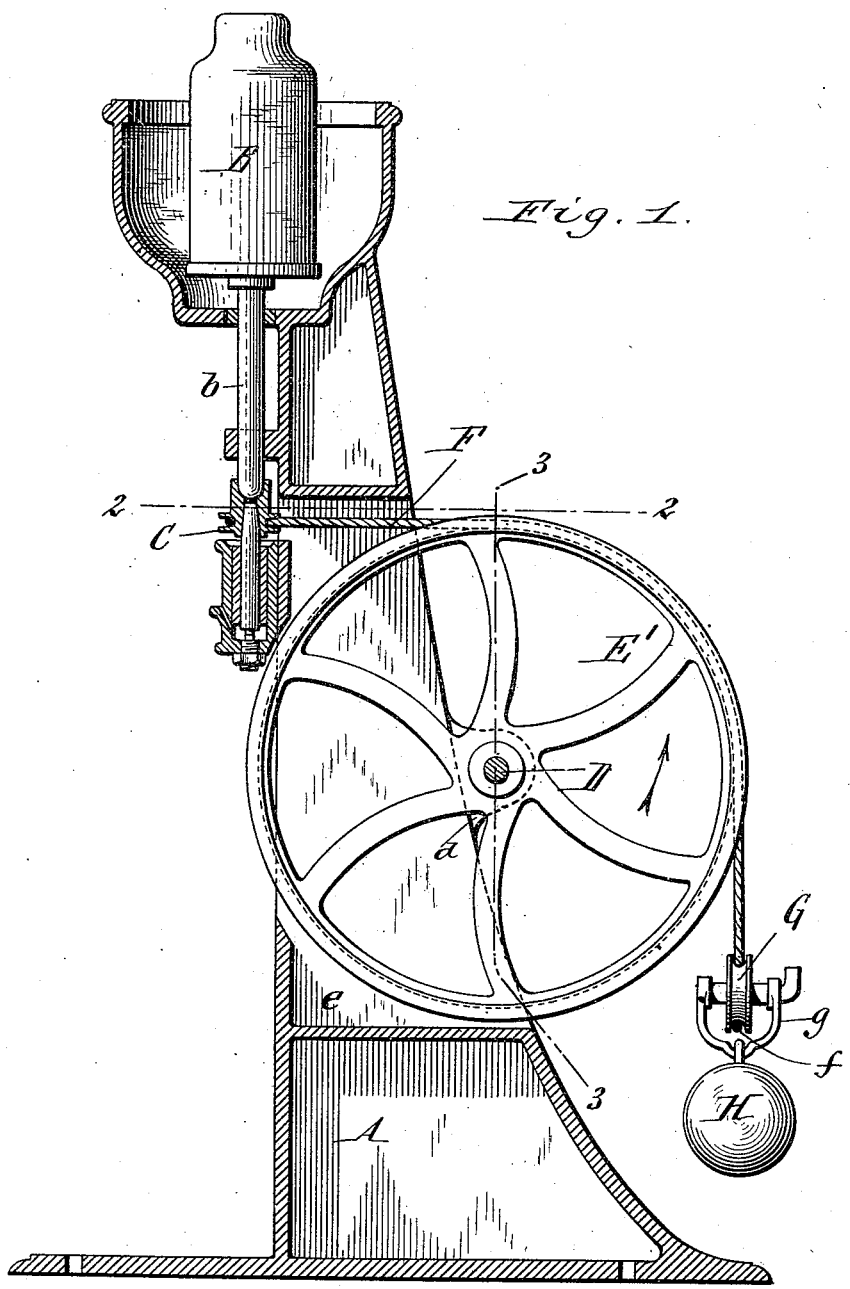

(No Model.) 2 Sheets—Sheet 2.
J. L. JÖNSSON.
DRIVING MECHANISM FOR CENTRIFUGAL SEPARATORS.
No. 512,033. Patented Jan. 2, 1894.
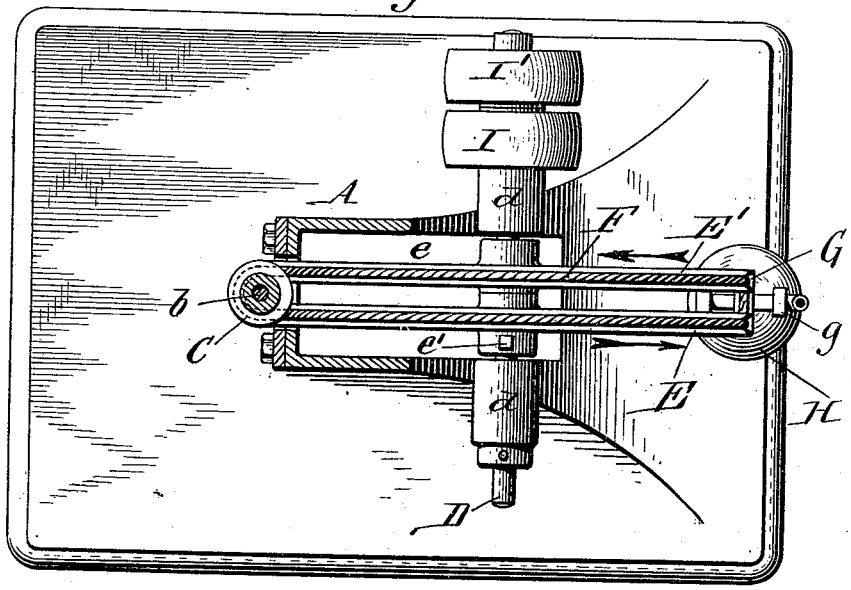
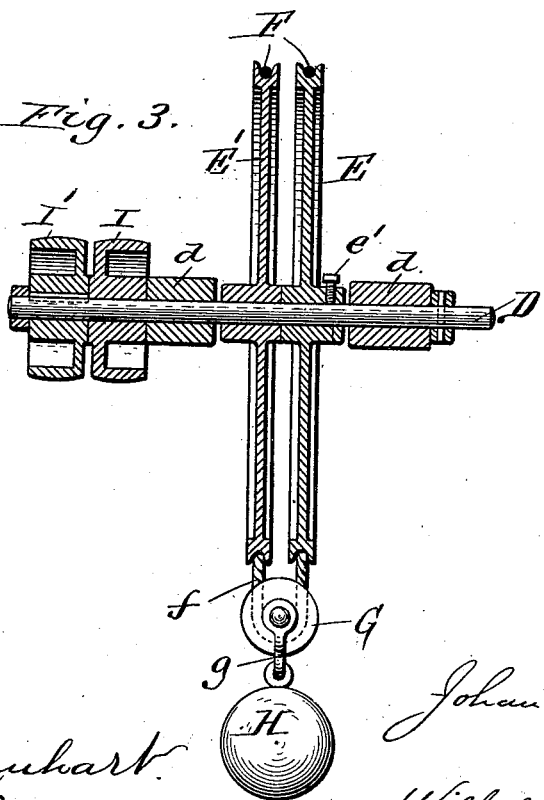
Witnesses:
Emil Neuhart
Theo. L. Popp
Johan L. Jönsson
Inventor
By Wilhelm Bonner
Attorneys.

UNITED STATES PATENT OFFICE.

JOHAN LUDVIG JÖNSSON, OF STOCKHOLM, SWEDEN, ASSIGNOR TO THE AKTIEBOLAGET SEPARATOR, OF SAME PLACE.

DRIVING MECHANISM FOR CENTRIFUGAL SEPARATORS.

SPECIFICATION forming part of Letters Patent No. 512,033, dated January 2, 1894.

Application filed September 7, 1893. Serial No. 484,961. (No model.)

*To all whom it may concern:*

Be it known that I, JOHAN LUDVIG JÖNSSON, a subject of the King of Sweden and Norway, residing at Stockholm, Sweden, have invented a new and useful Improvement in Driving Mechanism for Centrifugal Separators, &c., of which the following is a specification.

This invention relates to the mechanism by which the upright spindle of a centrifugal separator, or some other fast running spindle, is operated from a horizontal driving shaft, and has the object to provide a belt drive which permits the employment of a comparatively large driving pulley on the horizontal driving shaft in close proximity to the upright spindle, thereby increasing the speed to such an extent that in most cases, especially in power machines, the desired high rotative speed can be produced in the spindle without the intervention of a counter shaft and pulleys between the driving shaft and the spindle.

In the accompanying drawings consisting of two sheets:—Figure 1 is a sectional elevation of a centrifugal creamer provided with my improved belt driving mechanism. Fig. 2 is a horizontal section thereof in line 2—2, Fig. 1. Fig. 3 is a vertical section in line 3—3, Fig. 1.

Like letters of reference refer to like parts in the several figures.

A represents the upright frame of the machine, B the separating bowl, b the vertical spindle thereof arranged on the front side of the frame, and C the horizontal pulley secured to the spindle.

D represents the horizontal driving shaft arranged on the rear side of the frame and journaled in bearings d secured to the latter.

E E' represent two vertical grooved pulleys which are mounted on the driving shaft and which extend forwardly through an opening e in the frame. The uppermost points of these pulleys are arranged in a horizontal line with the horizontal spindle pulley C. The pulley E is secured to the driving shaft by a set screw e' or otherwise, and is the driving pulley; while the other pulley E' is mounted loosely on the shaft and is a guide pulley.

F represents an endless belt whereby motion is transmitted from the driving pulley to the spindle. This belt passes upwardly along the rear side of the guide pulley E', thence forwardly to and around the front half of the spindle pulley C, thence rearwardly to and downwardly over the rear side of the driving pulley E, so that the belt forms a bight f below the points where it leaves the rear sides of the pulleys.

G represents a tightener pulley which is hung in the bight f of the belt and which is journaled in a frame g. The latter carries a weight H which draws the belt taut and holds it snugly against the pulleys. One end of the horizontal driving shaft is provided with tight and loose pulleys I I' to which the main driving belt is applied when the machine is operated by power.

When the machine is operated by hand, the hand driving mechanism is geared with the horizontal driving shaft in any common manner. Upon rotating the horizontal driving shaft and the driving pulley E secured thereto, that portion of the belt resting upon the driving pulley E is carried in the same direction with this pulley, which causes the belt to rotate the spindle pulley and revolve the loose pulley E' in a direction opposite to that in which the driving pulley E rotates. This arrangement of a belt drive is very simple and enables the driving pulley to be made comparatively large and to be arranged closely to the upright spindle.

I claim as my invention—

The combination with the horizontal driving shaft and the vertical spindle provided with a horizontal pulley, of a vertical driving pulley secured to the driving shaft, a loose guide pulley arranged on one side of said driving pulley, an endless driving belt running around said spindle pulley and over said driving and guide pulleys and depending from said driving and guide pulleys, and a tightener pulley arranged in the depending bight of the driving belt, substantially as set forth.

JOHAN LUDVIG JÖNSSON.

Witnesses:
E. HAASE,
KLAS EKSTROM.